(12) United States Patent  
Barowski et al.

(10) Patent No.: US 9,679,099 B2  
(45) Date of Patent: Jun. 13, 2017

(54) DE-COUPLING CAPACITANCE PLACEMENT

(71) Applicant: International Business Machines Corporation, Armonk, NY (US)

(72) Inventors: Harry Barowski, Boeblingen (DE); Joachim Keinert, Altdorf (DE); Sourav Saha, Kolkata (IN); Thomas Strach, Wildberg (DE)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 14/788,819

(22) Filed: Jul. 1, 2015

(65) Prior Publication Data

US 2017/0004239 A1    Jan. 5, 2017

(51) Int. Cl.  
*G06F 17/50* (2006.01)

(52) U.S. Cl.  
CPC ...... *G06F 17/5081* (2013.01); *G06F 17/5072* (2013.01); *G06F 17/5077* (2013.01); *G06F 2217/82* (2013.01)

(58) Field of Classification Search  
CPC ............. H01L 27/0207; G06F 2217/78; G06F 17/5072; G06F 17/5036; G06F 17/505; G06F 2217/82  
USPC ................. 716/109, 115, 118–119, 132–136  
See application file for complete search history.

(56) References Cited

U.S. PATENT DOCUMENTS

| | | | |
|---|---|---|---|
| 6,487,706 B1 | 11/2002 | Barkley et al. | |
| 6,523,159 B2* | 2/2003 | Bernstein | G06F 17/5036 716/115 |
| 7,398,489 B2* | 7/2008 | Dinter | G06F 17/5068 257/E27.108 |
| 7,600,208 B1 | 10/2009 | Sharma et al. | |
| 7,698,677 B2 | 4/2010 | Zhao et al. | |
| 8,327,305 B1* | 12/2012 | Hooi | G06F 17/5072 716/121 |
| 8,701,067 B1 | 4/2014 | McSherry et al. | |
| 8,712,752 B2 | 4/2014 | Lau et al. | |
| 2003/0212973 A1 | 11/2003 | Lin et al. | |

OTHER PUBLICATIONS

Kahng et al., "Supply Voltage Degradation Aware Analytical Placement", Proceedings of the 2005 International Conference on Computer Design (ICCD'05), pp. 1-7, © 2005 IEEE.

(Continued)

*Primary Examiner* — Nghia Doan  
(74) *Attorney, Agent, or Firm* — Steven F. McDaniel

(57) ABSTRACT

A method, executed by one or more processors, includes receiving IR-drop information as a function of location for a placement for a plurality of circuit blocks corresponding to an integrated circuit, calculating a target density for decoupling capacitors as a function of location based on the IR-drop information, placing a plurality of decoupling capacitors according to the target density to provide placed decoupling capacitors. The placed decoupling capacitors may be locally clustered to improve decoupling performance. The method may also include incrementally moving circuit elements or placed decoupling capacitors to avoid collisions within one or more circuit blocks, and routing the integrated circuit. A corresponding computer program product and computer system are also disclosed herein.

20 Claims, 6 Drawing Sheets

(56) References Cited

OTHER PUBLICATIONS

Meng et al., "An Improved Active Decoupling Capacitor for "Hot-Spot" Supply Noise Reduction in ASIC Designs", pp. 584-593, © 2009 IEEE.
Nithin, S. K et al., "Dynamic Voltage (IR) Drop Analysis and Design Closure: Issues and Challenges", 11th Int'l Symposium on Quality Electronic Design, pp. 611-617, © 2010 IEEE.
Pedicone, John, "Practical Ways to Estimate, Implement, and Verify SoC Decoupling Capacitance", Electronic Design, Oct. 25, 2007, pp. 1-9, <http://electronicdesign.com/mobile/practical-ways-estimate-implement-and-verify-soc-decoupling-capacitance>.
Barowski et al., "De-Coupling Capacitance Placement", U.S. Appl. No. 14/925,097, filed Oct. 28, 2015, pp. 1-25.
IBM Appendix P, list of IBM patents or patent applications treated as related, Oct. 28, 2015, pp. 1-2.

* cited by examiner

DE-COUPLING CAPACITANCE PLACEMENT

BACKGROUND OF THE INVENTION

The present invention relates generally to designing electronic circuits such as integrated circuits, and more particularly to mitigating IR-drop in such circuits.

A power distribution network for an integrated circuit distributes power and ground voltages from pad locations to all devices in an integrated circuit. Shrinking device dimensions, faster switching frequencies, and increasing power consumption in deep sub-micrometer technologies cause large switching currents to flow in the power and ground networks. Due to the resistance of the pathways constituting the network, there is a voltage drop across the network, commonly referred to as IR-drop. IR-drop reduces the effective voltage seen by integrated circuit elements and may negatively affect circuit performance.

SUMMARY

A method, executed by one or more processors, includes receiving IR-drop information as a function of location for a placement for a plurality of circuit blocks corresponding to an integrated circuit, calculating a target density for decoupling capacitors as a function of location based on the IR-drop information, placing a plurality of decoupling capacitors according to the target density to provide placed decoupling capacitors. The placed decoupling capacitors may be locally clustered to improve decoupling performance. The method may also include incrementally moving circuit elements or placed decoupling capacitors to avoid collisions within one or more circuit blocks, and routing the integrated circuit. A corresponding computer program product and computer system are also disclosed herein.

DETAILED DESCRIPTION

The embodiments disclosed herein enable improved IR-drop mitigation. It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter.

IR-drop mitigation is an increasingly important aspect of integrated circuit design. One approach to IR-drop mitigation involves allocating extra space around circuit blocks and placing de-coupling capacitors near the perimeter of the circuit blocks. However, such an approach may require allocating more space than necessary and may not be optimal in that the de-coupling capacitors may be located too far away from violating regions within some circuit blocks to be effective. The embodiments disclosed herein improve the placement of decoupling capacitors within integrated circuits and thereby enable improved IR-drop mitigation.

Figure 1:
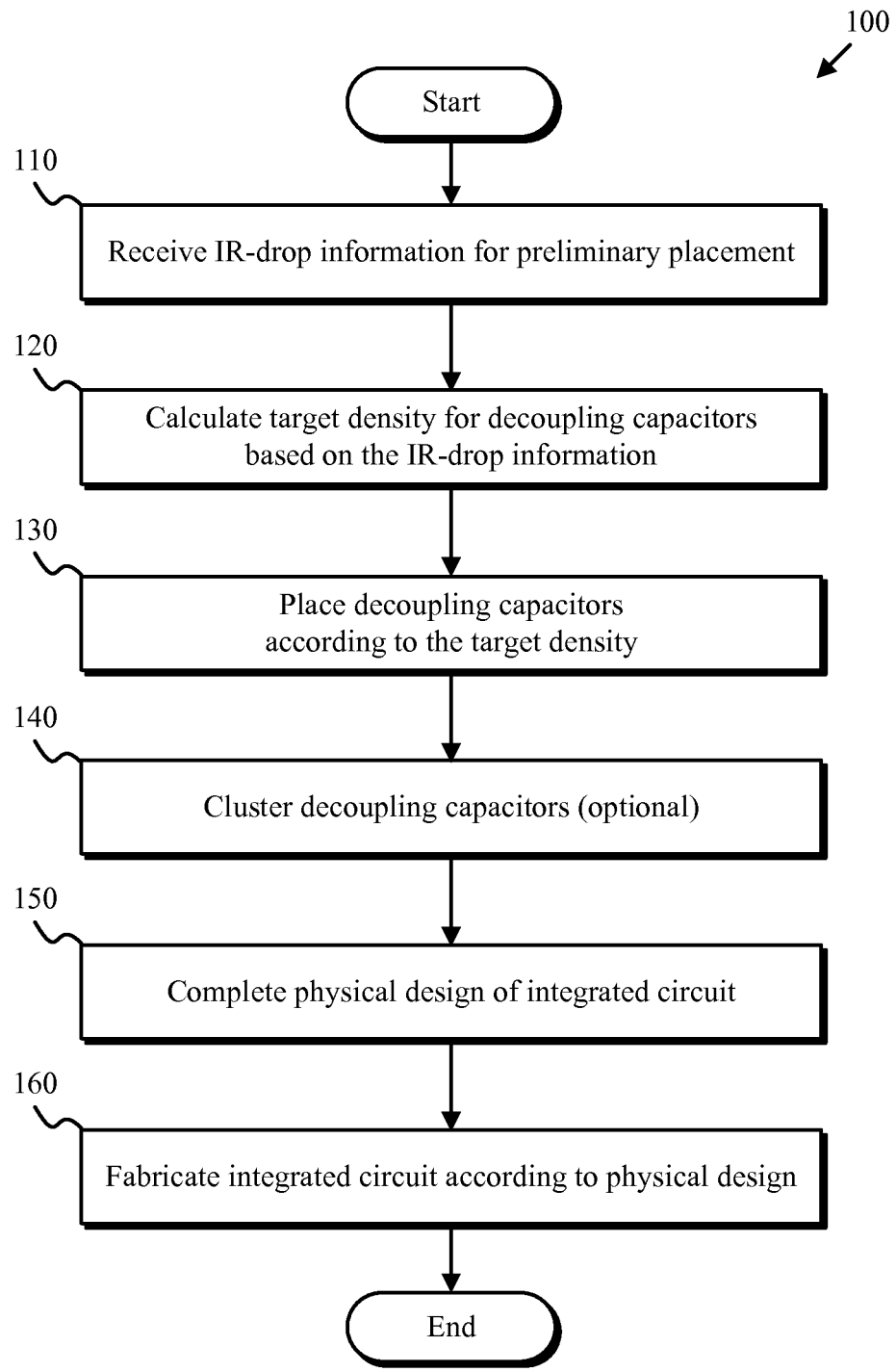
FIG. 1 is flowchart of one example of a decoupling capacitance placement method in accordance with some embodiments of the present invention.

For example, FIG. 1 is flowchart of one example of a capacitance placement method 100 in accordance with at least some embodiments of the present invention. As depicted, the capacitance placement method 100 includes receiving (110) IR-drop information, calculating (120) a target density for decoupling capacitors, placing (130) decoupling capacitors, clustering (140) decoupling capacitors, completing (150) physical design of the integrated circuit, and fabricating (160) the integrated circuit. The capacitance placement method 100 enables improved placement of decoupling capacitors within an integrated circuit.

Receiving (110) IR-drop information may include receiving an IR-drop table or map for a circuit placement that indicates (dynamic and/or static) IR-drop as a function of position. The IR-drop table or map may specify specific IR-drop values at various locations or may indicate regions that are within a certain IR-drop range (e.g., a contour map). See FIGS. 2A-2B and the associated description for one specific example of IR-drop information.

Calculating (120) a target density for decoupling capacitors may include processing the received IR-drop information to generate a target density for decoupling capacitors as a function of location. In some embodiments, only regions that have a marginal or unacceptable IR-drop are assigned a non-zero target density. See FIGS. 3A-3C and the associated description for two specific examples of how a target density for decoupling capacitors as a function of location may be computed from the IR-drop information.

Placing (130) decoupling capacitors may include placing or directing a placement engine (e.g., a place and route tool) to place decoupling capacitors according to the calculated target density. Using a target density facilitates flexibility in placement. For example, a place and route engine may try various placement locations for decoupling capacitors within a region and select the locations for the decoupling capacitors that improve circuit timing and facilitate effective routing. See FIG. 4A and the associated description for one specific example of placing decoupling capacitors according to the calculated target density.

Clustering (140) decoupling capacitors may include moving decoupling capacitors that are within a selected range to be adjacent to each other. The clustered decoupling capacitors may provide better decoupling that isolated decoupling capacitors. For example, some internal de-capacitance circuitry may be shared for adjacent decoupling capacitors. See FIG. 4B and the associated description for one specific example of clustering decoupling capacitors.

Completing (150) physical design of the integrated circuit may include routing the integrated circuit, conducting a timing analysis, and making adjustments to meet specific performance criteria. In some embodiments, placement adjustments are made and portions of the method 100 are repeated. Fabricating (160) the integrated circuit may include conducting various semiconductor processing operations to realize the specified physical design.

Figure 2A:
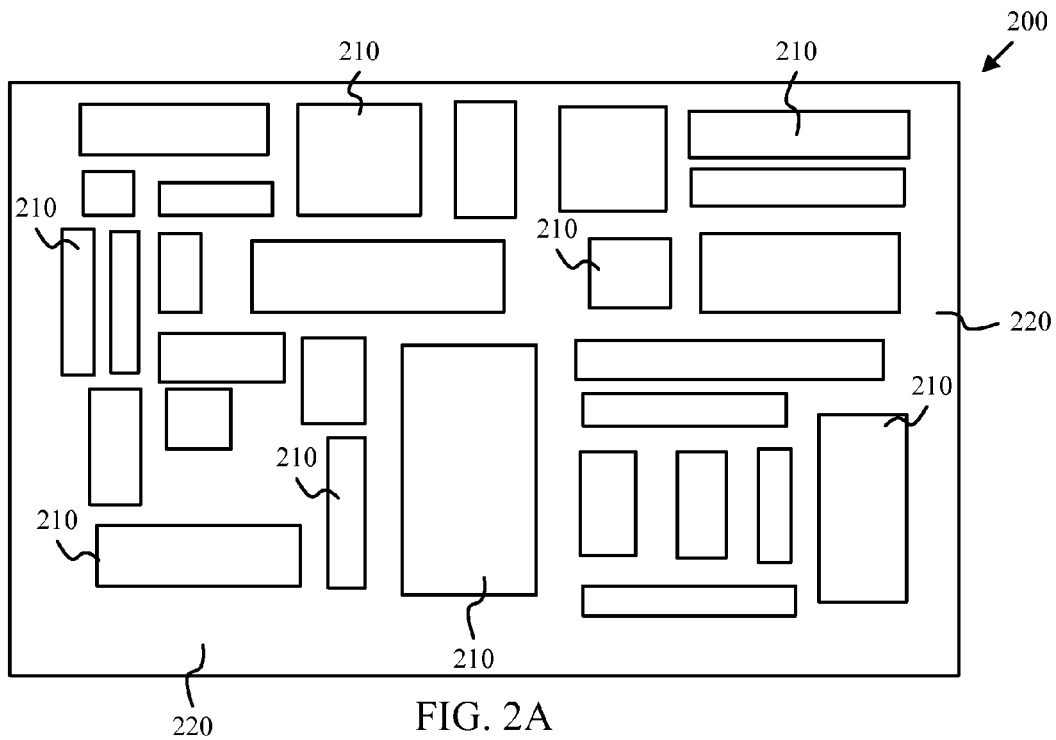
FIG. 2A is a plan map depicting one example of an integrated circuit floorplan in accordance with some embodiments the present invention.

FIG. 2A is a plan map depicting one example of an integrated circuit floorplan 200 in accordance with some embodiments the present invention. As depicted, the integrated circuit floorplan 200 includes a number of circuit blocks 210 that are placed at specific locations on a substrate 220 according to an initial placement. The circuit blocks 210 may assume a particular circuit density (e.g., 70%) that accommodates the placement of decoupling capacitors within the boundary of the circuit blocks 210. In some embodiments, the assumed circuit density is related to the expected IR-drop for the particular circuit block 210.

Figure 2B:
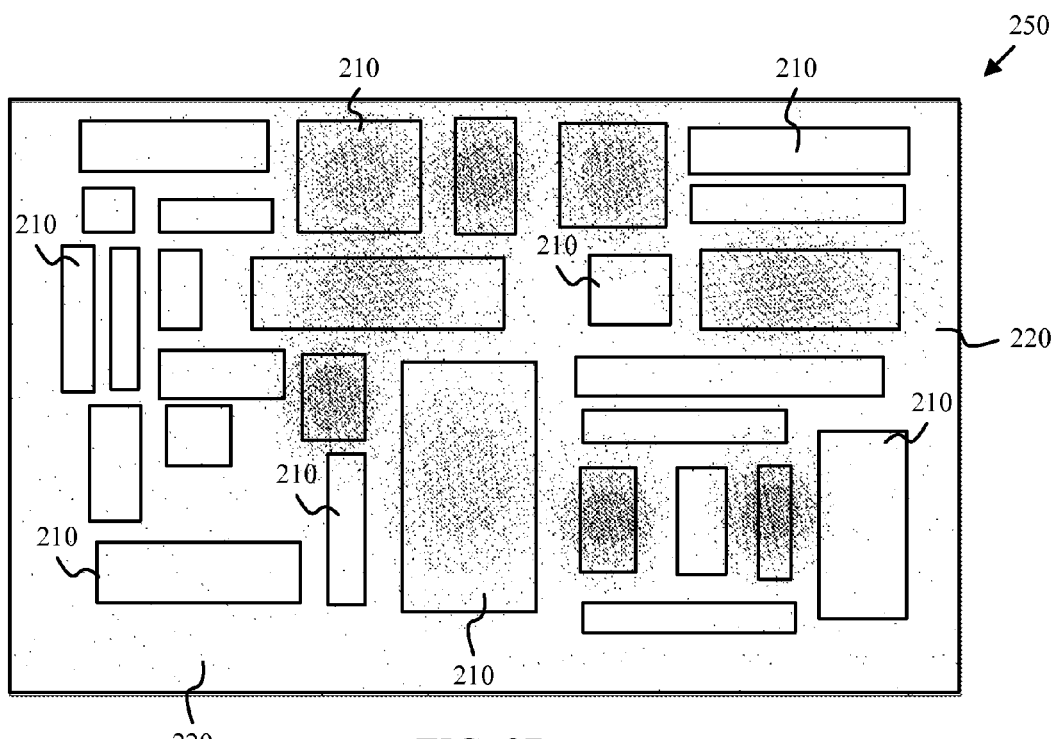
FIG. 2B is a density map depicting one example of IR-drop information in accordance with some embodiments the present invention.

FIG. 2B is a density map depicting one example of IR-drop information 250 in accordance with some embodiments the present invention. The depicted IR-drop information 250 is a density map that corresponds to the example floorplan 200 depicted in FIG. 2B. Regions of higher IR-drop are depicted in FIG. 2B with a higher density stipple pattern.

In some embodiments, the IR-drop information is obtained by conducting a circuit analysis process on the initial placement of the circuit blocks 210. The circuit analysis process may assume one or more workloads. The IR-drop information may be used to identify violating and marginal regions of the integrated circuit as well as complying regions.

Figure 3A:
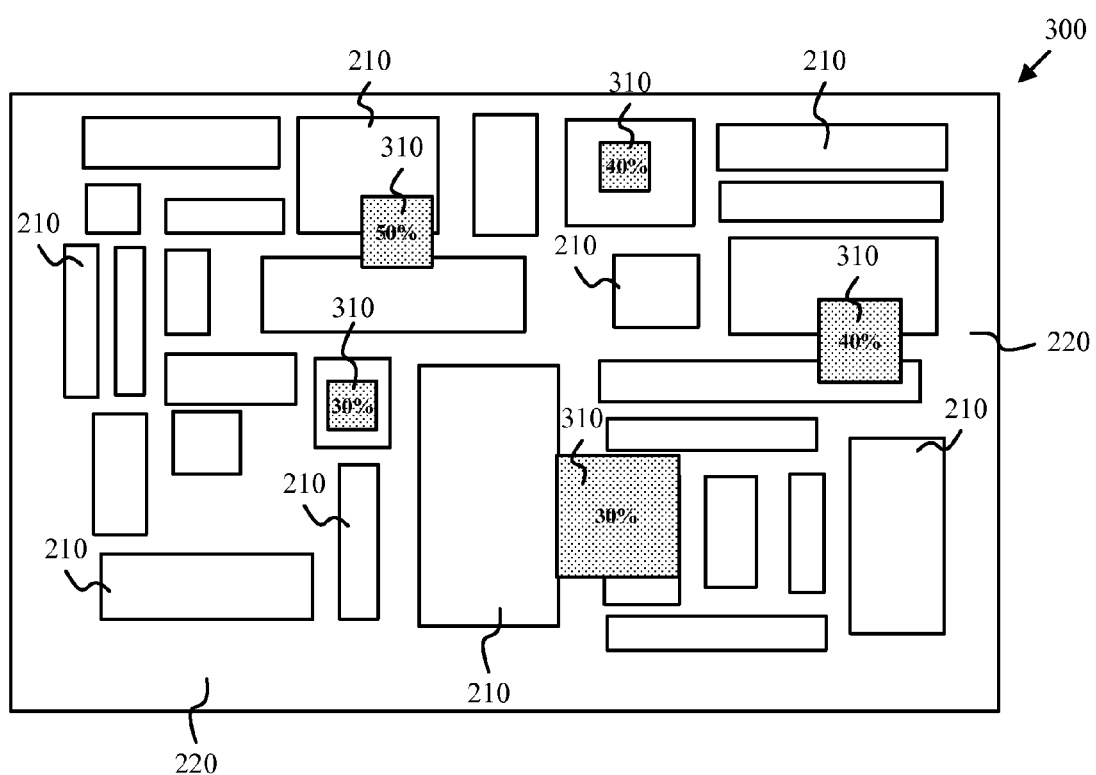
FIG. 3A is a plan map depicting an example integrated circuit with a target density function superimposed thereon in accordance with some embodiments the present invention.

FIG. 3A is a plan map depicting an example integrated circuit 300 with a target density function 310 superimposed thereon. In the depicted embodiment, the target density function 310 comprises areas that have a constant density value (e.g., 30-50%). The density values provided by target density function 310 essentially indicate the portion (i.e., fraction) of the proximate area that is targeted for decoupling capacitance. The remaining portion of the proximate area may be used for placement of the circuit elements within the particular circuit block 210.

In certain embodiments, the areas of constant density value (e.g., the regions 310 depicted in FIG. 3A) are squares or circles that are located and sized by processing the IR-drop information to identify violating regions, determine a center point for each violating region, and select a decoupling fill factor (i.e., target density value) and size (e.g., diameter) for the violating region.

In one particular embodiment, an integrated circuit is partitioned into tiles. The size of the tiles may correspond to the reach (i.e., effectiveness distance) of a decoupling capacitor. For example, the diagonal length or diameter of the tiles may be selected to be less than or equal to twice the reach of a decoupling capacitor. In the described particular embodiment, each tile is subdivided into grid elements and an average IR-drop is computed for each grid element. The average IR-drop of the grid elements may be used as a weighting factor to compute an IR-drop centroid for the tile. The IR-drop centroid may be selected as the center position for a non-zero target density region 310. Similarly, the average IR-drop for the entire tile along with the average circuit density within the tile may be used to calculate the size and density value (i.e., decoupling capacitance fill factor) of the target density region 310. In some embodiments, IR-drops that are below a selected value and target density regions 310 that are below a selected size (e.g., the size of a decoupling capacitor) are ignored or deleted.

Figure 3B:
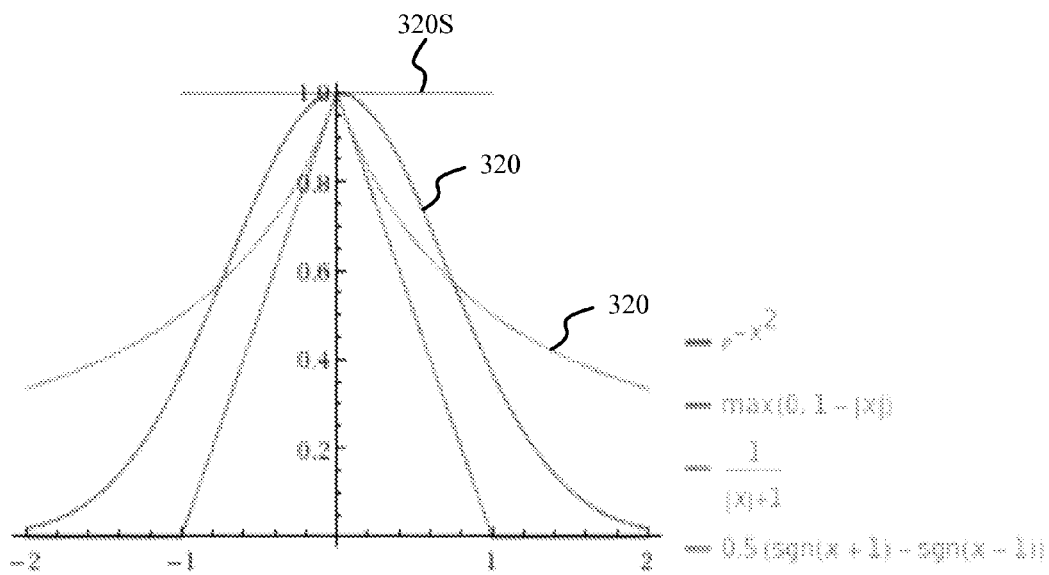
FIG. 3B is a graph depicting various examples of decoupling reach functions in accordance with some embodiments the present invention.

FIG. 3B is a graph depicting various examples of decoupling reach functions 320 in accordance with some embodiments the present invention. Rather the dividing the integrated circuit into discrete tiles and grid elements and computing a target density function from the average IR-drop within the discrete tiles and grid elements, a more continuous approach may be used.

Figure 3C:
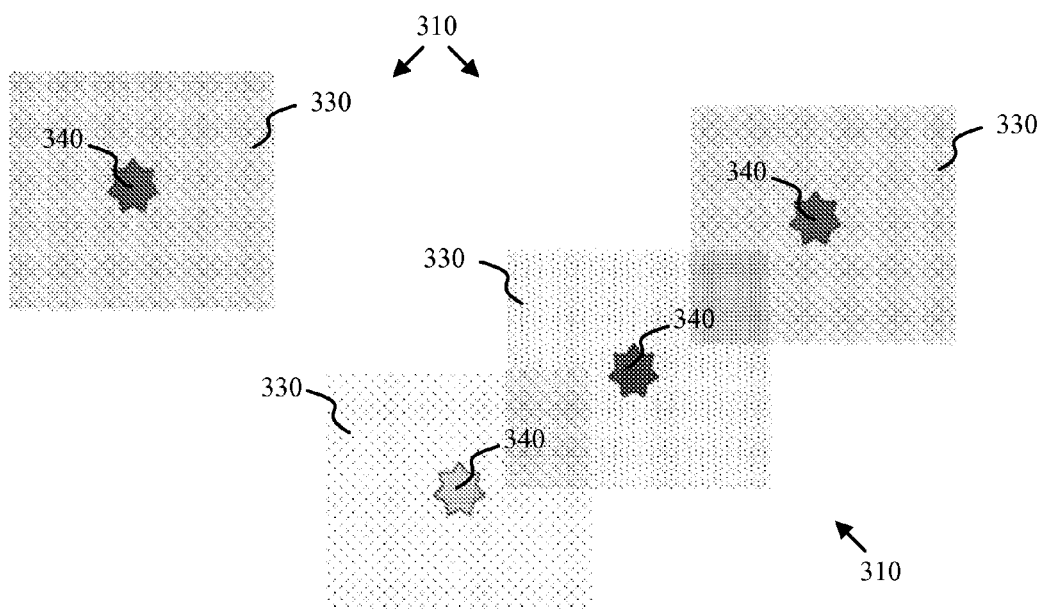
FIG. 3C is a plan map depicting one example of a target density function derived from placing Decoupling reach functions at selected locations in accordance with some embodiments the present invention.

For example, as shown in FIG. 3C a weighted decoupling function 330 may be placed at each violation point specified by the IR-drop information. The weighted decoupling function 330 may be computed from a selected decoupling reach function 320S and the amount of IR-drop at each violation point 340. For the purpose of simplicity, the selected decoupling reach function 320S depicted in FIGS. 3B and 3C is a box function and each weighted decoupling function 330 is the product of the selected decoupling reach function 320s and the amount of IR-drop at the violation point 340.

To compute the target density function 310 at each location on the integrated circuit, each of the weighted decoupling functions 330 that overlap at each particular location may be summed. The effect of summing is simulated in FIG. 3 by the visual overlap of the stippling patterns that represent the weighted decoupling functions 330 that surround each violation point 340. Consequently, the highest target density specified by the target density function 310 need not coincide with a violation point 340.

One of skill in the art may appreciate that a number of approaches such as the two approaches shown in FIGS. 3A-3C may be used to generate a target density function 310 for decoupling capacitance. The resulting target density function may continuous or non-continuous. The target density function may cover the entire integrated circuit or may be limited to specific violation regions. The target density function may be used to direct the placement of decoupling capacitors at locations that are effective in their reach. Rather than specifying specific locations for decoupling capacitors, the use of a target density function enables a place and route engine, or the like, to place the decoupling capacitors at locations within the circuit blocks 210, or the like, where they may be more effective.

Figure 4A:
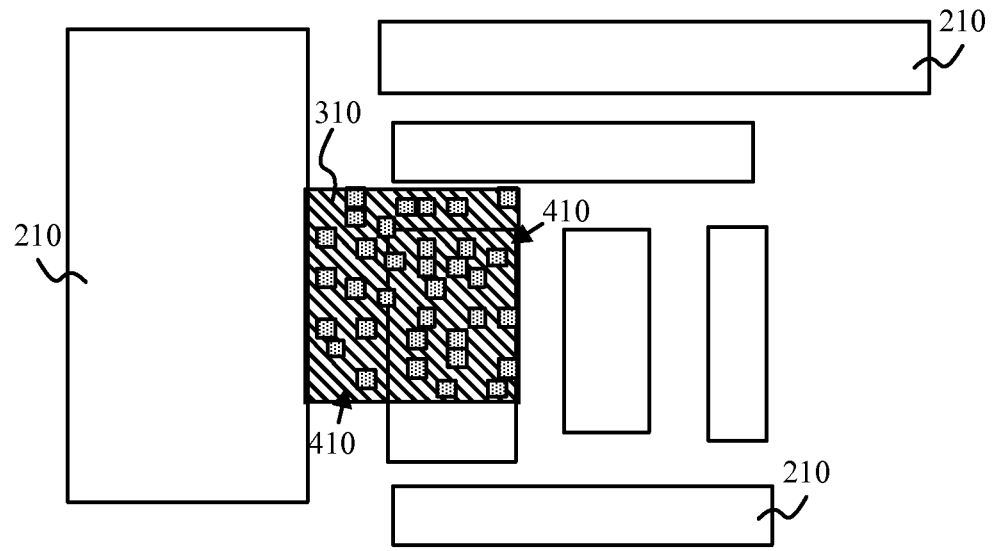
FIGS. 4A and 4B are plan maps showing placed decoupling capacitors before and after clustering in accordance with some embodiments the present invention.
Figure 4B:
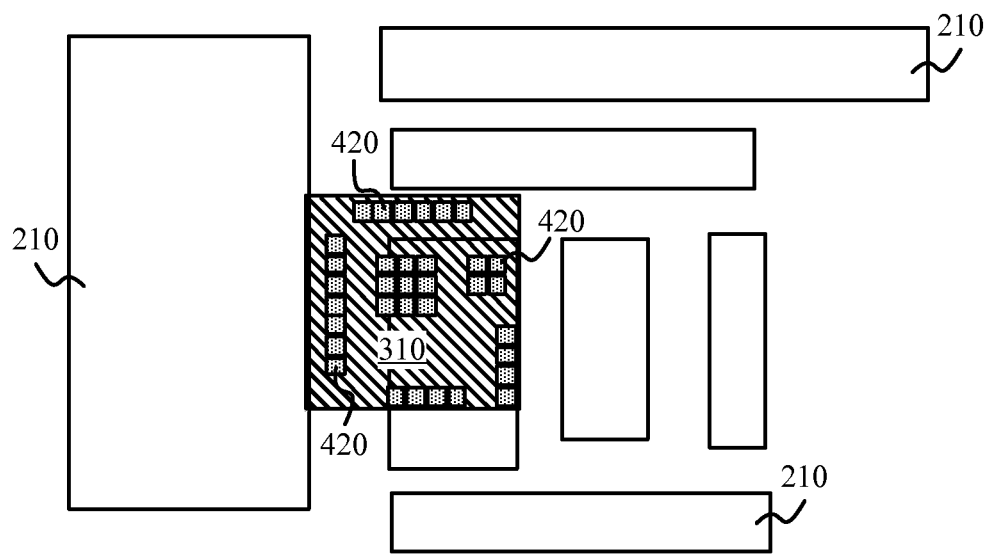

FIGS. 4A and 4B are plan maps showing placed decoupling capacitors before and after clustering in accordance with some embodiments the present invention. After various decoupling capacitors 410 are placed according to the target density function 310, they may be moved adjacent to each other to form a capacitor cluster 420. The capacitor cluster 420 may keep the capacitors 410 within an effective reach of the circuit elements they are proximate to within the circuit blocks 210 while improving capacitance and signal routeability.

Figure 5:
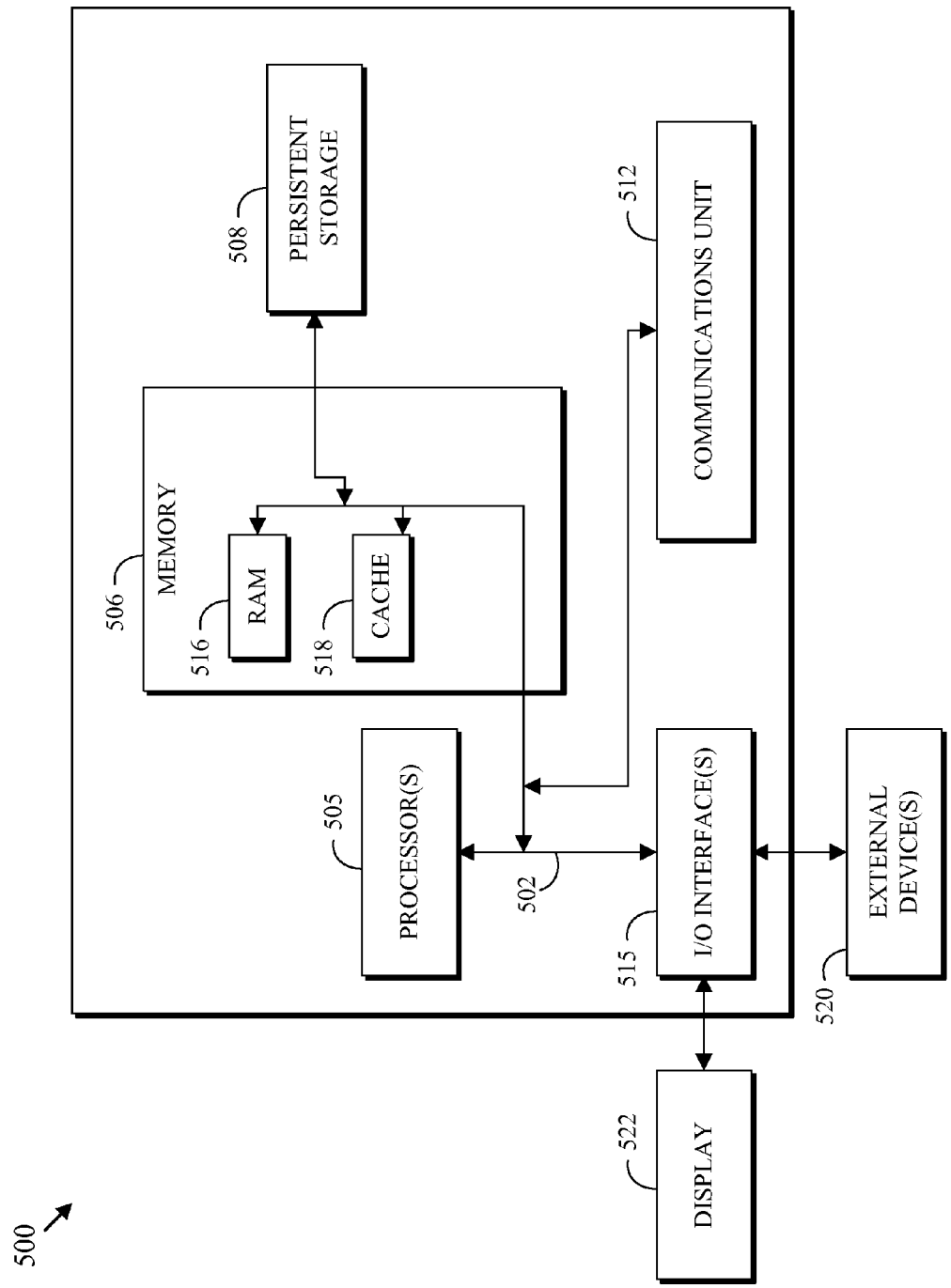
FIG. 5 is a block diagram depicting one example of a computing apparatus (i.e., computer) suitable for executing the methods disclosed herein.

FIG. 5 is a block diagram depicting one example of a computing apparatus (i.e., computer 500) suitable for executing the methods disclosed herein. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 505, memory 506, persistent storage 508, communications unit 512, and input/output (I/O) interface(s) 515. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 505 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 515 allows for input and output of data with other devices that may be connected to computer 500. For example, I/O interface 515 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 515. I/O interface(s) 515 may also connect to a display 522. Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A computer program product comprising:
one or more computer readable storage media and program instructions stored on the one or more computer readable storage media, the program instructions comprising instructions to:
receive IR-drop information as a function of location for a placement of a plurality of circuit blocks corresponding to an integrated circuit,
calculate a target density, with respect to area, for decoupling capacitors as a function of location based on the IR-drop information, wherein calculating the target density comprises identifying a violating region, determining a center point for the violating region, and selecting a decoupling fill factor for the violating region
place a plurality of decoupling capacitors according to the target density to provide placed decoupling capacitors,
produce a completed physical design of the integrated circuit based at least in part on the placed decoupling capacitors; and
store the completed physical design on a computer readable storage medium.

2. The computer program product of claim 1, wherein the program instructions comprise instructions to incrementally move circuit elements or placed decoupling capacitors to avoid collisions within one or more circuit blocks.

3. The computer program product of claim 1, wherein the violating region violating region is a region for which an IR-drop exceeds a predetermined value.

4. The computer program product of claim 3, wherein the violating region is limited to a selected maximum radius.

5. The computer program product of claim 3, wherein the decoupling fill factor accounts for a circuit density of one or more circuit blocks that overlap the violating region.

6. The computer program product of claim 1, wherein the instructions to calculate the target density comprise instructions to:
place a decoupling reach function at each violation point of a plurality of violation points to provide a plurality of placed decoupling reach functions;

and integrate the plurality of placed decoupling reach functions to provide the target density for decoupling capacitors, as a function of location.

7. The computer program product of claim 6, wherein the decoupling reach function corresponds to a decoupling effectiveness as a function of distance.

8. The computer program product of claim 6, wherein the placed decoupling reach functions are weighted according to a severity of the respectively corresponding violation points.

9. The computer program product of claim 1, wherein the placed decoupling capacitors are locally clustered to improve decoupling performance.

10. The computer program product of claim 1, wherein the program instructions comprise instructions to route the integrated circuit.

11. The computer program product of claim 1, wherein the placement of the plurality of circuit blocks reflects a selected circuit density for the plurality of circuit blocks.

12. The computer program product of claim 1, wherein the IR-drop information comprises a map.

13. A computer system comprising:
one or more computers;
one or more computer readable storage media and program instructions stored on the one or more computer readable storage media for execution by at least one of the computers, the program instructions comprising instructions to:
receive IR-drop information as a function of location for a placement of a plurality of circuit blocks corresponding to an integrated circuit,
calculate a target density with respect to area, for decoupling capacitors, as a function of location based on the IR-drop information, wherein calculating the target density comprises identifying a violating region, determining a center point for the violating region, and selecting a decoupling fill factor for the violating region, and
place a plurality of decoupling capacitors according to the target density to provide placed decoupling capacitors,
produce a completed physical design of the integrated circuit based at least in part on the placed decoupling capacitors; and
store the completed physical design on a computer readable storage medium.

14. The computer system of claim 13, wherein the program instructions comprise instructions to incrementally move circuit elements or placed decoupling capacitors to avoid collisions within one or more circuit blocks.

15. The computer system of claim 13, wherein the violating region is a region for which an IR-drop exceeds a predetermined value.

16. The computer system of claim 13, wherein the placed decoupling capacitors are locally clustered to improve decoupling performance.

17. The computer system of claim 13, wherein the program instructions comprise instructions to route the integrated circuit.

18. The computer system of claim 13, wherein the program instructions to calculate the target density for decoupling capacitors comprise instructions to:
place a decoupling reach function at each violation point of a plurality of violation points to provide a plurality of placed decoupling reach functions; and
integrate the plurality of placed decoupling reach functions to provide the target density for decoupling capacitors as a function of location.

19. The computer system of claim 18, wherein the decoupling reach function corresponds to a decoupling effectiveness as a function of distance.

20. The computer system of claim 13, wherein the program instructions further comprise instructions to fabricate the integrated circuit, including the placed decoupling capacitors.

* * * * *